(12) United States Patent
Ballabio et al.

(10) Patent No.: US 9,188,975 B2
(45) Date of Patent: Nov. 17, 2015

(54) METHOD FOR CONTROLLING THE MOVEMENT OF BUILDING MEMBERS OF A TYRE IN A PROCESS FOR MANUFACTURING TYRES FOR VEHICLE WHEELS

(71) Applicant: PIRELLI TYRE S.p.A., Milan (IT)

(72) Inventors: Michele Ballabio, Milan (IT); Gaetano Lo Presti, Milan (IT); Bartolomeo Montrucchio, Turin (IT); Vincenzo Orlando, Turin (IT); Gianni Mancini, Milan (IT)

(73) Assignees: Pirelli Tyre S.p.A., Milan (IT); Politecnico Di Torino, Turin (IT)

( * ) Notice: Subject to any disclaimer, the term of this patent is extended or adjusted under 35 U.S.C. 154(b) by 0 days.

(21) Appl. No.: 13/261,872

(22) PCT Filed: Nov. 15, 2012

(86) PCT No.: PCT/IB2012/056437
§ 371 (c)(1),
(2) Date: May 14, 2014

(87) PCT Pub. No.: WO2013/076627
PCT Pub. Date: May 30, 2013

(65) Prior Publication Data

US 2014/0288689 A1 Sep. 25, 2014

Related U.S. Application Data

(60) Provisional application No. 61/564,800, filed on Nov. 29, 2011.

(30) Foreign Application Priority Data

Nov. 21, 2011 (IT) .............................. MI2011A2115

(51) Int. Cl.
*G05B 19/418* (2006.01)
*B29D 30/16* (2006.01)
*B29D 30/30* (2006.01)

(52) U.S. Cl.
CPC ............ *G05B 19/4189* (2013.01); *B29D 30/16* (2013.01); *B29D 30/30* (2013.01); *B29D 2030/1664* (2013.01); *B29D 2030/3064* (2013.01)

(58) Field of Classification Search
CPC ............. G05B 19/4189; G05B 19/402; G05B 19/404; G05B 19/19; B29D 30/30; B29D 30/16; B29D 2030/3064; B29D 2030/1664
See application file for complete search history.

(56) References Cited

U.S. PATENT DOCUMENTS

| 4,359,675 A | 11/1982 | Miller, III |
| 5,206,720 A | 4/1993 | Clothiaux et al. |

(Continued)

FOREIGN PATENT DOCUMENTS

| DE | 100 36 010 A1 | 2/2002 |
| JP | 9-5246 | 1/1997 |
| WO | WO 92/12852 | 8/1992 |
| WO | WO 99/07153 | 2/1999 |

OTHER PUBLICATIONS

International Search Report from the European Patent Office for International Application No. PCT/IB2012/056437 mailed Mar. 1, 2013.

(Continued)

*Primary Examiner* — Mohammad Ali
*Assistant Examiner* — Nathan L Laughlin
(74) *Attorney, Agent, or Firm* — Finnegan, Henderson, Farabow, Garrett & Dunner, L.L.P.

(57) ABSTRACT

Method and apparatus for controlling the movement of building members of a tyre in a process for manufacturing tyres for vehicle wheels includes: providing a first device of a first electromagnetic radiation on a first tyre building member; detecting, during a movement of the first building member, a first image in which the first electromagnetic radiation defines a trajectory followed, in the movement, by the first emitter device; carrying out a first comparison between the first image and one or more first reference data; and generating a first notification signal as a function of the first comparison.

47 Claims, 7 Drawing Sheets

(56) References Cited

U.S. PATENT DOCUMENTS

| | | | |
|---|---|---|---|
| 5,281,289 A * | 1/1994 | Debroche et al. | 156/117 |
| 2002/0023705 A1 | 2/2002 | Marchini et al. | |
| 2004/0079487 A1 | 4/2004 | Marchini et al. | |
| 2007/0125478 A1 * | 6/2007 | Weissert et al. | 156/117 |
| 2010/0043940 A1 | 2/2010 | Ogawa | |
| 2010/0200152 A1 * | 8/2010 | Marchini et al. | 156/117 |

OTHER PUBLICATIONS

Written Opinion of the International Search Authority from the European Patent Office for International Application No. PCT/IB2012/056437 mailed Mar. 1, 2013.

\* cited by examiner

METHOD FOR CONTROLLING THE MOVEMENT OF BUILDING MEMBERS OF A TYRE IN A PROCESS FOR MANUFACTURING TYRES FOR VEHICLE WHEELS

The present invention has the object of providing a method for controlling the movement of building members of a tyre in a process for manufacturing tyres for vehicle wheels. The aforementioned invention further regards an apparatus for controlling the movement of building members of a tyre in a process for manufacturing tyres for vehicle wheels.

The term "strip-like element" is used to indicate a piece of a continuous elongated element cut to size, having a flat transverse section, made of elastomeric material and embedding one or more textile or metallic reinforcement cords (preferably at least two), arranged parallel with respect to each other in the longitudinal direction of the elongated element itself.

The strip-like elements, suitably approached or partly superimposed on each other, may cooperate to form various components of a tyre.

In some cases, the piece of a continuous elongated element cut to size may have a longitudinal dimension and a transverse dimension comparable to each other, preferably substantially equivalent to each other. In this case, the strip-like elements are plate-like elements, having a substantially quadrangular configuration in plan view.

The term "component" of the tyre is used to indicate any component adapted to serve a function (in the tyre) or a part thereof, for example selected from among: liner, under-liner, carcass ply/plies, under-belt insert, belt strips both crossed with respect to each other and at zero degrees, binding sheet for the tread band, tread band, bead core, bead filler, textile, metallic or solely elastomeric material reinforcement inserts, anti-abrasive insert, sidewall inserts.

The expression "detecting an image" is used to indicate obtaining a matrix of spots or frames, in analogue or digital form, provided as output by a detection device, and defined by the incident radiation on a detection window of such device in a given time interval, referred to as "shutter speed" or "exposure time". During this interval the device is kept uninterruptedly active, so that all detectable radiations which, in the interval, have an impact on the detection window, are represented in a single image, thus the detected image. The radiation (or radiations) cooperating to form the image are those to which the detection device is sensitive, and they are comprised, for example, in a given interval of wavelengths.

In the present context, each detected image represents a trajectory and not a simple luminous spot generated in an instant of infinitesimal duration by a device for emitting the aforementioned radiation.

Currently manufacturing of tyres at industrial level provides for the use of plants in which the machines operating therein have various moveable parts, controlled in an automated manner.

These machines typically comprise successions of operative members and elements, through which the manufacturing processes are performed.

In this context, terminal members or devices of such successions, i.e. the parts of the machine that directly come to contact with the tyre being processed are particularly important.

By way of example, there may be considered manufacturing processes in which the tyre is obtained by depositing semi-finished elements around a building support, such as for example a forming drum. The semi-finished elements are deposited by means of members, referred to as "depositing members".

Such semi-finished elements may for example comprise the aforementioned strip-like elements.

The strip-like elements, suitably approached or partly superimposed on each other, cooperate to form some components of the tyre.

Preferably, the strip-like elements may be used for manufacturing the carcass plies, of the belt strips, or of other reinforcement components present in the tyre.

The Applicant observed that, failure by the moveable elements operating in the various machines to accurately perform the desired trajectory may lead to different types operating drawbacks. For example the end product, i.e. the tyre, may reveal mechanical and structural characteristics differing from the expected ones, and thus having a lower quality with respect to tyres manufactured using machines operating correctly. More precisely, considering building the tyre comprising depositing strip-like elements, were the latter not to be positioned correctly (adjacent to each other, or partly superimposed on each other), the tyre will reveal structural shortcomings that could make it unusable. By way of further illustrating the fact that failure to move the elements or members of a tyre building plant or apparatus in a precisely controlled manner, it may cause interferences, collisions and/or impacts that may damage the same machines.

With reference to depositing strip-like elements, the Applicant realised that a poorly reliable control of the depositing member may lead the latter to come to contact with excessive force with the outer surface of the tyre being processed, at the occurrence of depositing each strip-like element: after a given number of depositing operations, the member could be damaged, specifically due to the plurality of unwanted stresses it is subjected to.

Thus, the Applicant verified that an accurate and reliable control of the movement of the members within the tyre manufacturing plant may allow preventing and avoiding a series of problems, thus increasing the quality of the manufactured products.

Furthermore, the Applicant perceived that such control technique should be simple and quick so as to allow performance thereof:

a) substantially in real time due to the quickness thereof, so that any problems, errors, and malfunctions can be detected and notified as soon as they occur, allowing correction within a short period of time;

b) through hardware/software resources having limited complexity, due to the simplicity thereof, thus obtaining advantages in terms of reliability of the control structure and reducing costs for the implementation thereof.

Thus, the Applicant realized that a solution meeting the aforementioned needs may provide for the use of an emitter, for example a laser emitter, associated with a building member and a device for detecting the radiation emitted by the aforementioned emitter.

More precisely, the Applicant found that at the occurrence of the movement of a building member to which a radiation emitter is associated, there is detected—by a suitably prepared detector—the radiation emitted by the aforementioned emitter, the detection originates an image in which the trajectory followed by the building member during the movement thereof is visible: comparing the trajectory with the reference data allows obtaining the control of the movement of aforementioned building member.

Preferably, the image is detected using an exposure time (or shutter speed) comparable with the time required by the building member to carry out the movement thereof. The detection device used shall thus remain uninterruptedly active over a preset period of time, during which the building member is expected to describe a given trajectory.

According to a first aspect, the invention regards a method for controlling the movement of building members of a tyre in a process for manufacturing tyres for vehicle wheels comprising:
- providing, a first device for emitting a first electromagnetic radiation on a first tyre building member;
- detecting, during movement of said first building member, a first image in which said first electromagnetic radiation defines a trajectory followed, in said movement, by said first emitter device;
- carrying out a first comparison between said first image and one or more first reference data;
- generating a first notification signal as a function of said first comparison.

The Applicant deems that in this manner, a considerable amount of data, which allows evaluating the correctness of the movement of the monitored member relative to a prestored optimal theoretical trajectory as well as evaluating the coherence and repeatability of the movement of the member over time, comparing the detected image with one or more images detected previously, regarding the same movement of the member, in one image is stored.

According to a further aspect, the invention regards an apparatus for controlling the movement of building members of a tyre in a process for manufacturing tyres for vehicle wheels comprising:
- a first emitter device mounted on a first tyre building member and provided for emitting a first electromagnetic radiation;
- a detecting structure for detecting, during movement of said first building member, a first image in which said first electromagnetic radiation defines a trajectory followed, in said movement, by said first emitter device;
- a processing unit operatively associated with at least said detecting structure and configured for:
  - carrying out a first comparison between said first image and one or more first reference data;
  - generating a first notification signal as a function of said first comparison.

In one or more of the aforementioned aspects, the invention may comprise one or more of the preferred characteristics specified hereinafter.

Preferably said first electromagnetic radiation has a wavelength substantially included between about 700 nm and about 1200 nm.

Preferably said first building member is a member for depositing strip-like elements for producing a tyre for vehicle wheels.

Preferably said first building member is configured for repeating a given movement a plurality of times, on occurrence of which said first emitter device describes a corresponding given first trajectory.

Preferably, said first image fully contains said given first trajectory.

In this manner, through single images detected as mentioned above, it is possible to perform verifications both regarding precision and the time coherence, of the building operations.

Preferably the first trajectory described by said first emitter device substantially lies in a first plane.

Preferably said first electromagnetic radiation is transmitted along a direction substantially perpendicular to said first plane.

In this manner, it is possible to carry out detections of the trajectory described by the first emitter device, that are reliable and correctly interpretable.

Preferably said first emitter device is associated with a first optical structure having a first through hole defining a passage port for said first electromagnetic radiation.

Preferably said first through hole is substantially circular-shaped having a diameter substantially comprised between about 0.05 mm and about 2 mm.

This allows suitably determining the dimensions of the luminous spot generated by the first emitter device, obtaining the desired resolution without leading to the diffraction phenomena.

Preferably said first image is detected by a first detection device.

Preferably said first detection device is activated by a first activation signal generated at the beginning of the movement of said first building member.

Preferably said first detection device is deactivated by a first deactivation signal generated at the end of the movement of said first building member.

Preferably the time interval included between said beginning and said end of the movement of said first building member defines an exposure time for detection of said first image.

In this manner, in a single detected image, there is obtained the complete representation of an entire movement of the first building member.

Preferably said first detection device is repeatedly actuated for detecting a plurality of first images, each representative of a respective trajectory of said first building member.

Preferably, the first reference data for each of said first images comprise one or more of the other first images.

This allows evaluating the time coherence of the movement of said first building member, i.e. the capacity of such first building member to repeat the same movement in a substantially identical manner over time.

Preferably said first detection device is associated with a first bandpass filter centred on the wavelength selected for the first electromagnetic radiation and having bandpass substantially included between about 10 nm and about 100 nm.

Preferably said first reference data comprise prestored data defining an optimal theoretical trajectory for said first building member.

This allows verifying whether each movement of the first building member follows a predefined desired trajectory.

Preferably an emission intensity of said first emitter device along said first trajectory is varied over time.

Preferably the variation in intensity of said emission is a periodic variation, in which the period is smaller than the time duration of said first trajectory.

Preferably said variation comprises alternation between a comparatively high emission intensity, and a comparatively low emission intensity.

In this manner, also through a single detected image, it is possible to know the time at which the first building member performed the movement thereof.

Preferably said variation is determined as a function of movements of other building members cooperating to obtain said tyre.

This allows verifying, a posteriori, whether said first building member was moved according to a correct synchronism relative to other building members part of the building apparatus/plant.

Preferably said other building members comprise a forming drum configured for rotating around a rotation axis thereof during the movement of said first building member, said variation being determined as a function of the angular position of said forming drum relative to said rotation axis.

This allows verifying, through single detected images, the correct synchronism between the movement of the first building member and the rotation of said forming drum.

Preferably there is provided, on a second tyre building member, a second device for emitting a second electromagnetic radiation; during movement of said second building member, there is detected a second image in which said second electromagnetic radiation defines a trajectory followed, in said movement, by said second emitter device.

Preferably, said first notification signal is generated also as a function of said second image.

Preferably said second electromagnetic radiation has a wavelength substantially included between about 700 nm and about 1200 nm.

Preferably said first reference data comprise data representative of said second image.

This allows comparing the movements performed by different building members to each other, and in particular it may be verified whether the first and the second building member describe symmetric trajectories, where provided for by the building process.

Preferably a second comparison between said second image and one or more second reference data is carried out, and a second notification signal is generated as a function of said second comparison.

Preferably said second reference data comprise prestored data defining an optimal theoretical trajectory for said second building member.

This allows verifying whether each movement of the second building member follows a desired defined trajectory.

Preferably said second building member is a member for depositing strip-like elements for obtaining a tyre for vehicle wheels.

Preferably said second building member is configured for repeating a given movement a plurality of times, on occurrence of which said second emitter device describes a corresponding given second trajectory.

Preferably, said second image fully contains said given second trajectory.

In this manner, through single detected images as described above, it is possible to verify both the precision and coherence of the building operations over time.

Preferably the second trajectory described by said second emitter device substantially lies in a second plane.

Preferably said second electromagnetic radiation is transmitted along a direction substantially perpendicular to said second plane.

This allows carrying out detections of the second trajectory described by the second emitter device, that are reliable and correctly interpretable.

Preferably said second emitter device is associated with a second optical structure having a second through hole defining a passage port for said second electromagnetic radiation.

Preferably said second through hole is substantially circular-shaped having a diameter substantially included between about 0.05 mm and about 2 mm.

This allows suitably determining the dimensions of the luminous spot generated by the second emitter device, obtaining the desired resolution without leading to diffraction phenomena.

Preferably said first plane and second plane are substantially coincident. This allows simplifying and making the operations for detecting and comparing the detected images more reliable.

Preferably said second image is detected by means of a second detection device.

Preferably said second detection device is activated by a second activation signal generated at the beginning of the movement of said second building member.

Preferably said second detection device is deactivated by a second deactivation signal generated at the end of the movement of said second building member.

Preferably the time interval included between said beginning and said end of the movement of said second building member defines an exposure time for detection of said second image.

In this manner, in a single detected image, there is obtained the complete representation of an entire movement of the second building member.

Preferably said second detection device is repeatedly actuated for detecting a plurality of second images, each representative of a respective trajectory of said second building member.

Preferably, the second reference data for each of said second images comprise one or more of the other second images.

This allows evaluating the time coherence of the movement of said second building member, i.e. the capacity of such second building member to repeat the same movement in a substantially identical manner over time.

Preferably said second detection device is associated with a second bandpass filter centred on the wavelength selected for the second electromagnetic radiation and having bandpass substantially included between about 10 nm and about 100 nm.

Preferably an emission intensity of said second emitter device along said second trajectory is varied over time.

Preferably the variation in intensity of said emission is a periodic variation, in which the period is smaller than the time duration of said second trajectory.

Preferably said variation comprises alternation between a comparatively high emission intensity, and a comparatively low emission intensity.

In this manner, also through a single detected image, it is possible to know the time at which the second building member performed the movement thereof.

Preferably said variation is determined as a function of movements of other building members cooperating in manufacturing said tyre.

This allows verifying, a posteriori, whether said first building member was moved according to a correct synchronism relative to other building members part of the building apparatus/plant.

Preferably said other building members comprise a forming drum configured for rotating around a rotation axis thereof during the movement of said second building member, said variation being determined as a function of the angular position of said forming drum relative to said rotation axis.

This allows verifying, through single detected images, the correct synchronism between the movement of the second building member and the rotation of said forming drum.

Preferably the emission intensity of said first emitter device and the emission intensity of said second emitter device are varied so that, at each time instant, said first emitter device and said second emitter device substantially emit at the same intensity.

In this manner, comparing a first detected image and a corresponding second detected image allows not only comparing the trajectory followed, respectively, by the first and by the second building member, but also the time with which such trajectories were described.

Preferably said detecting structure comprises at least one first detection device for detecting at least said first image.

Preferably said processing unit is configured for repeatedly actuating said first detection device for detecting a plurality of first images, each representative of a respective trajectory of said first building member.

Preferably said processing unit is connected to said first emitter device for varying over time an emission intensity of said first emitter device along said first trajectory.

Preferably said detecting structure is adapted to detect, during movement of said second building member, a second image in which said second electromagnetic radiation defines a trajectory followed, in said movement, by said second emitter device.

Preferably said processing unit is configured for generating said first notification signal also as a function of said second image.

Preferably said processing unit is configured for:
  carrying out a second comparison between said second image and one or more second reference data;
  generating a second notification signal as a function of said second comparison.

Preferably said processing unit is configured for generating said first activation signal and said first deactivation signal, for activating/deactivating said first detection device.

Preferably said detecting structure comprises a second detection device for detecting said second image.

Preferably said processing unit is configured for repeatedly actuating said second detection device for detecting a plurality of second images, each representative of a respective trajectory of said second building member.

Preferably said processing unit is connected to said second emitter device for varying over time an emission intensity of said second emitter device along said trajectory.

Preferably said processing unit is configured for varying the emission intensity of said first emitter device and the emission intensity of said second emitter device so that, in each time instant, said first emitter device and said second emitter device substantially emit at the same intensity.

Preferably said processing unit is configured for generating said second activation signal and said second deactivation signal for activating/deactivating said second detection device.

Further characteristics and advantages shall be more apparent from the detailed description of a preferred and non-exclusive embodiment of the invention.

Such description is provided hereinafter with reference to the attached figures, also being provided purely by way of a non-limiting example, wherein:

FIG. 3 shows a schematic side view of the members of FIG. 2a;

With reference to the attached figures, a tyre for vehicle wheels, obtained in a process in which building members are controlled through the method and/or the apparatus according to the invention is described in its entirety with 1.

The tyre 1 (FIG. 1) essentially comprises a substantially toroidal-shaped carcass structure 2, and one or more structural elements made of elastomeric material 5, 28, 29, 31 associated with the carcass structure 2, to be described further in detail hereinafter. The carcass structure 2 may for example comprise a pair of annular anchoring structures 3, integrated in the area usually referred to as "beads", each for example made up of at least one substantially circumferential annular insert 4, usually referred to as "bead core", formed by one or more rubber-covered cords or equivalent elongated reinforcement elements embedded in an elastomeric matrix. An elastomeric filler 5 may be applied in a position radially external to the bead core 4. To each of the annular anchoring structures 3 there are coupled the terminal zones 6a of at least one carcass ply 6 comprising textile or metallic rubber-covered cords, or equivalent elongated reinforcement elements embedded in an elastomeric matrix and extending transverse to the circumferential development of the tyre 2, possibly according to a predetermined inclination, from one to the other of the annular anchoring structures 3.

Figure 1:
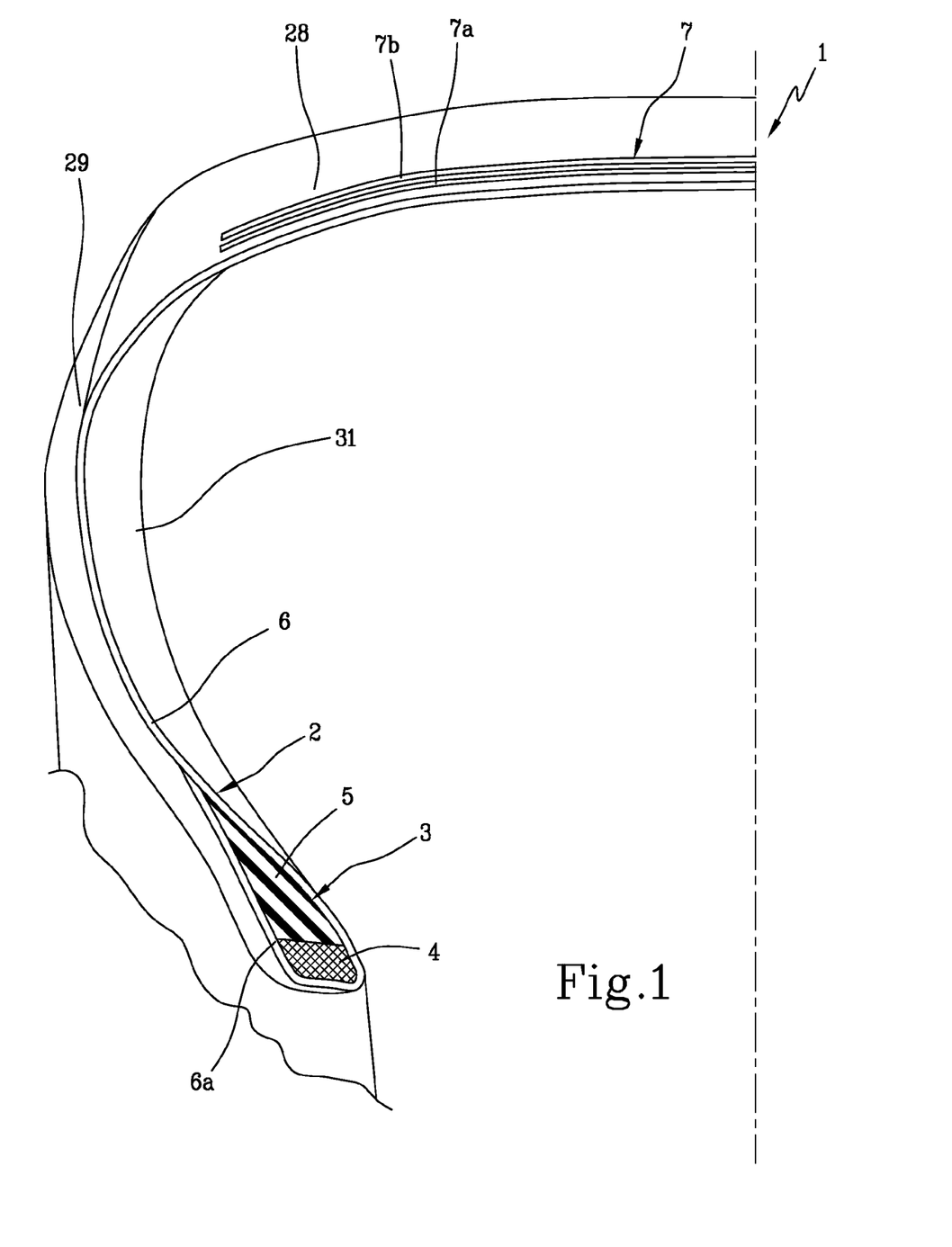
FIG. 1 schematically shows—in a diametrically interrupted section—a tyre for vehicle wheels.

In tyres of the "tubeless" type, i.e. without the air chamber, the carcass structure 2 is in a position radially inside a layer made of elastomeric material substantially impermeable to air generally referred to as "liner" (not shown).

To the carcass structure 2 there are also usually associated one or more belt layers 7a, 7b comprising metallic or textile rubber-covered cords, or equivalent elongated reinforcement elements embedded in an elastomeric matrix, suitably inclined relative to the circumferential development of the tyre according to preferably crossed orientations between one belt layer and the other, as well as a possible layer of the so-called a zero degree type (not shown) comprising one or more cords circumferentially wound according to axially adjacent turns around the belt layers 7a, 7b. The belt layers 7a, 7b and the possible zero degree layer together define a so-called belt structure indicated in its entirety with 7, having a substantially cylindrical annular shape, applied in a radially external position around the carcass structure 2.

Furthermore, a tread band 28 circumferentially applied in a radially outer position on the belt structure 7, and a pair of sidewalls 29 applied laterally on opposite sides on the carcass structure 2 are also associated with the carcass structure 2.

In the run flat tyres or tyres intended for particular purposes, there may also be provided for auxiliary support inserts 31, for example of the type usually referred to as "sidewall inserts", applied in proximity of the sidewalls 29 inside the carcass ply 6, as exemplified in FIG. 1, or between two carcass plies paired or in a position axially external to the carcass structure 2.

The invention is particularly applicable to processes in which the tyre 1 is built by associating the aforementioned strip-like elements to each other, depositing the same on suitable forming supports.

Depending on the type of process used, the forming support may be a substantially toroidal-shaped or substantially cylindrical building drum.

In particular, the strip-like elements may be used for providing one or more carcass plies of the carcass structure and/or of one or more belt strips or layers of the belt structure of the tyre.

Figure 2A:
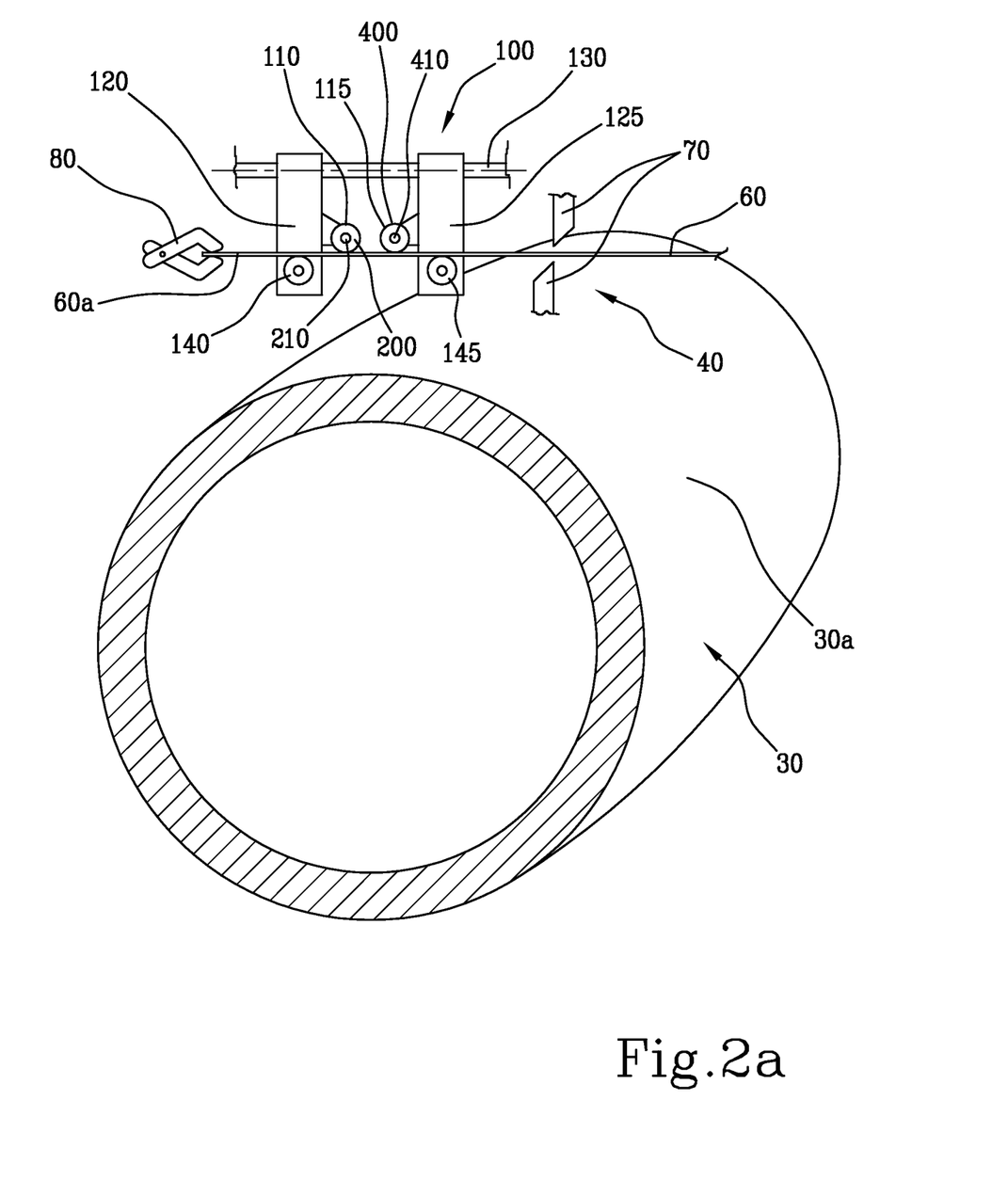
FIGS. 2a-2c show a schematic front view of members operating in a part of a process for building the tyre 1, in which a strip-like element is deposited on a forming support.
Figure 2B:
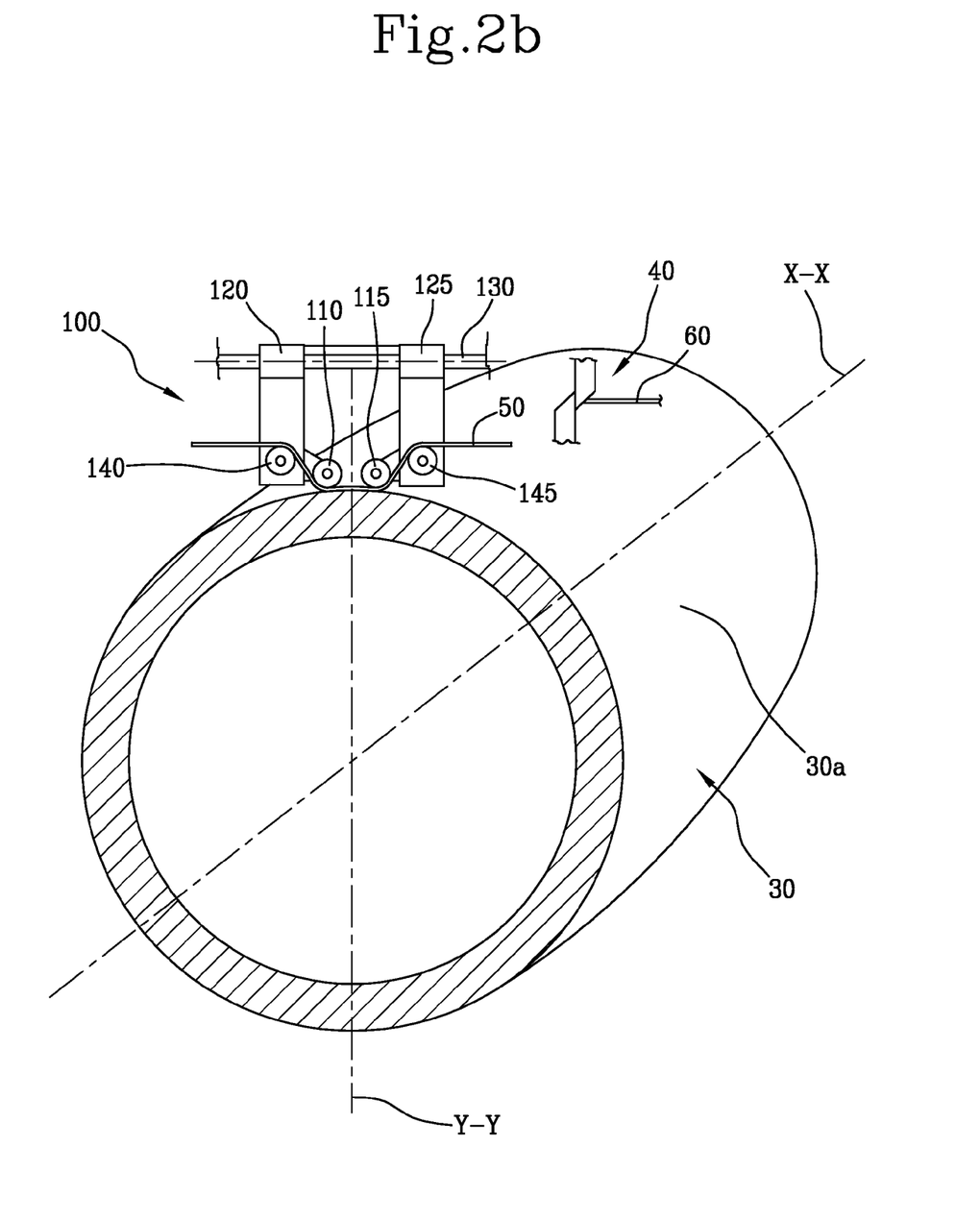
Figure 2C:
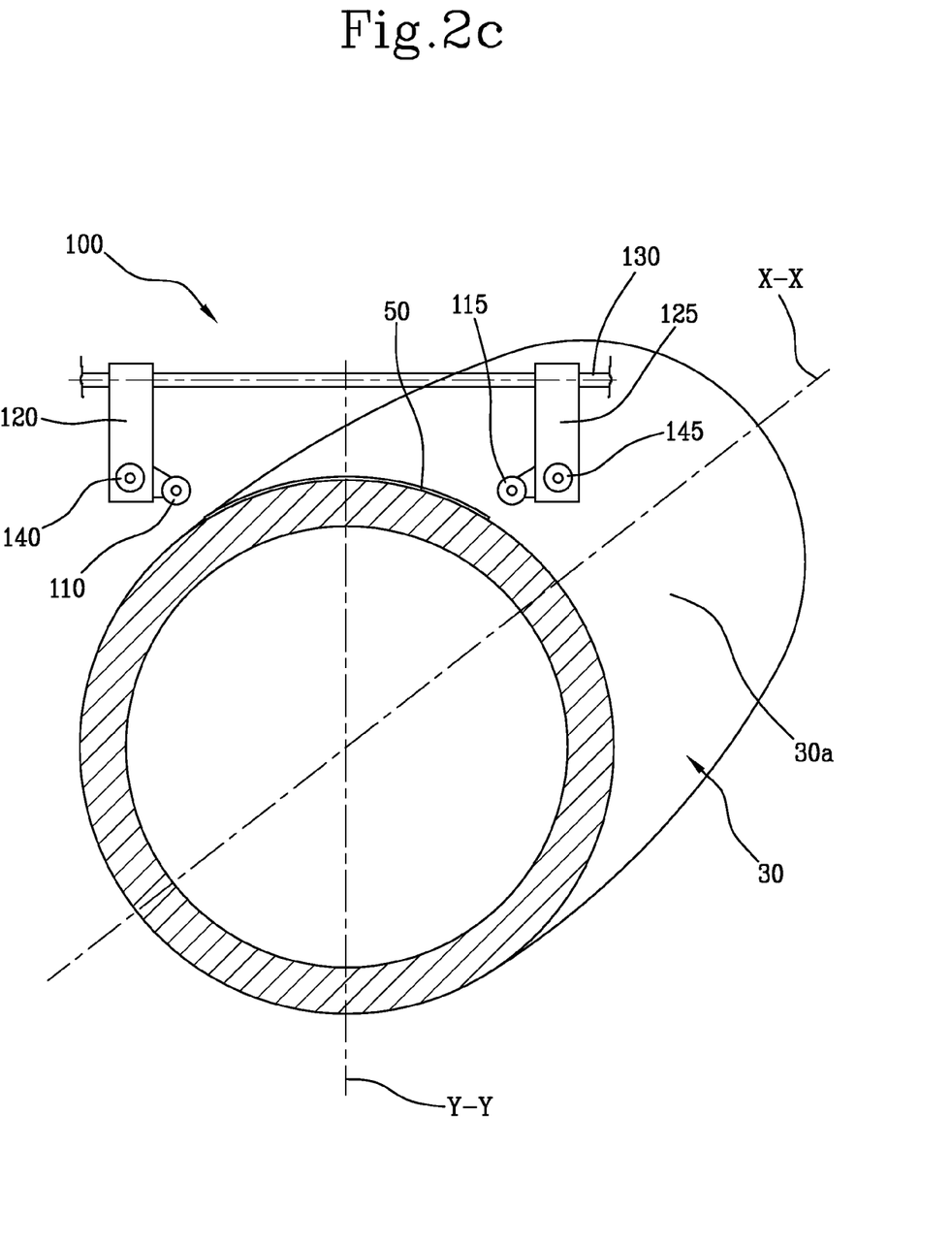

By way of example, FIGS. 2a-2c schematically show steps of a process for depositing strip-like elements aimed at providing a belt structure 7 on a forming support 30.

As clearer hereinafter, the invention is particularly applicable in processes of this type, i.e. processes in which one or more components of the tyre 1 are obtained by depositing and/or mutually approaching the semi-finished elements. However, it should be observed that the invention may be also analogously applied in tyre building processes in which the tyres are made using different techniques.

Further in detail, FIGS. 2a-2c show a supply unit 40 adapted to provide, preferably one at a time, strip-like elements 50 of predetermined length, obtained through cutting operations performed sequentially on at least one continuous elongated element 60.

The supply unit 40 comprises at least one cutting member 70 adapted to cut the elongated element 60 so as to obtain the strip-like elements 50.

The cutting member 70 is associated with a grip member 80 moveable between a first operating position in which it engages an end 60a of the continuous elongated element 60 in proximity of the cutting member 70, and a second operating position in which it is in a distal position relative to the cutting member 70.

As shown in FIG. 2a, following the translation from the first to the second operating position, the grip member 80 drags the elongated element 60 so as to extend the elongated element 60 and face it to the outer surface 30a of the forming support 30.

A deposition device 100 is adapted to engage each strip-like element 50, provided as described above, so as to apply the same on the outer surface 30a of the forming support 30, according to a preset angle relative to a circumferential direction of development of the very forming support.

Preferably the deposition device 100 comprises at least one first deposition member 110, moveable along the strip-like element 50, in relation to the contrast with the outer surface 30a of the forming support 30.

Preferably, the deposition device 100 further comprises a second deposition member 115.

In a preferred embodiment, the first and the second deposition member 110, 115 are supported by respective support elements 120, 125, moveable along a guide 13 under the action of mechanical or electromechanical actuators.

Preferably each support element 120, 125 is engaged to a respective constraint element 140, 145 adapted to cooperate with the respective deposition member 110, 115 for holding the strip-like element 50 between the cutting operation by the cutting member 70 and the deposition on the forming support 30.

By way of example, each constraint element 140, 145 may be obtained as a roller extending from the support element 120, 125 as schematically shown in FIGS. 2a-2c and 3.

When performing the deposition operation, the deposition members 110, 115 are approached to the outer surface 30a of the forming support 30 in a substantially radial direction, through suitable actuators (not illustrated).

In this manner, the strip-like element 50 is brought to contact with the surface on which it should be deposited.

Subsequently, the deposition members 110, 115 are moved so as to move one away from the other, as shown in FIG. 2c.

Upon finishing the deposition of the strip-like element 50, the deposition members 110, 115 return to the initial position thereof, so as to be able to operate on the subsequent strip-like element provided by the supply unit 40.

As mentioned, the invention may be advantageously applied to a deposition process of strip-like elements like the one summarily described above.

It is however clear that the invention may also be applied to different processes.

Figure 3:
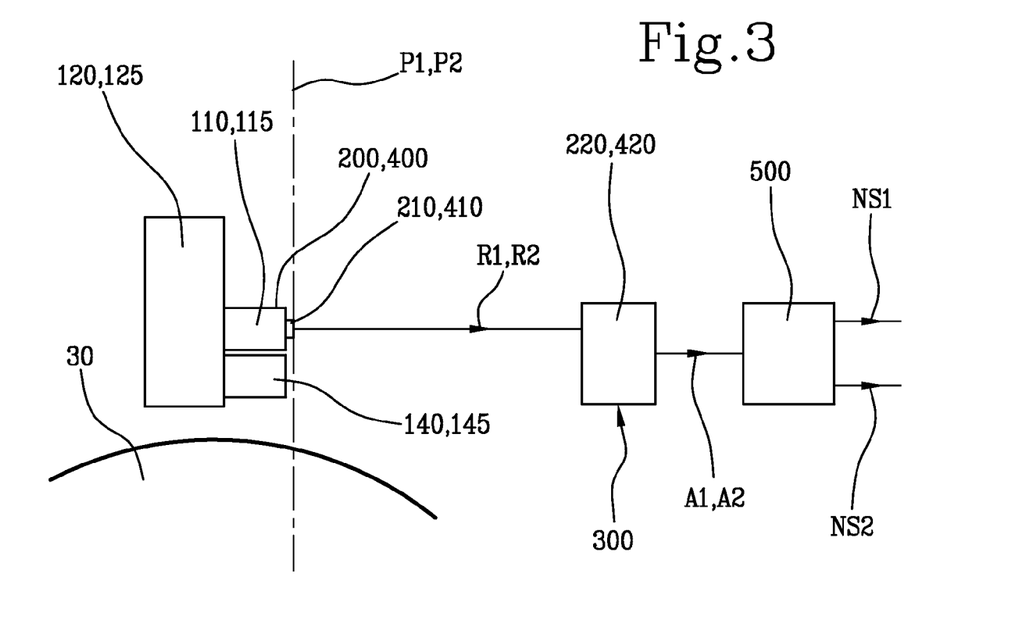
Figure 5:
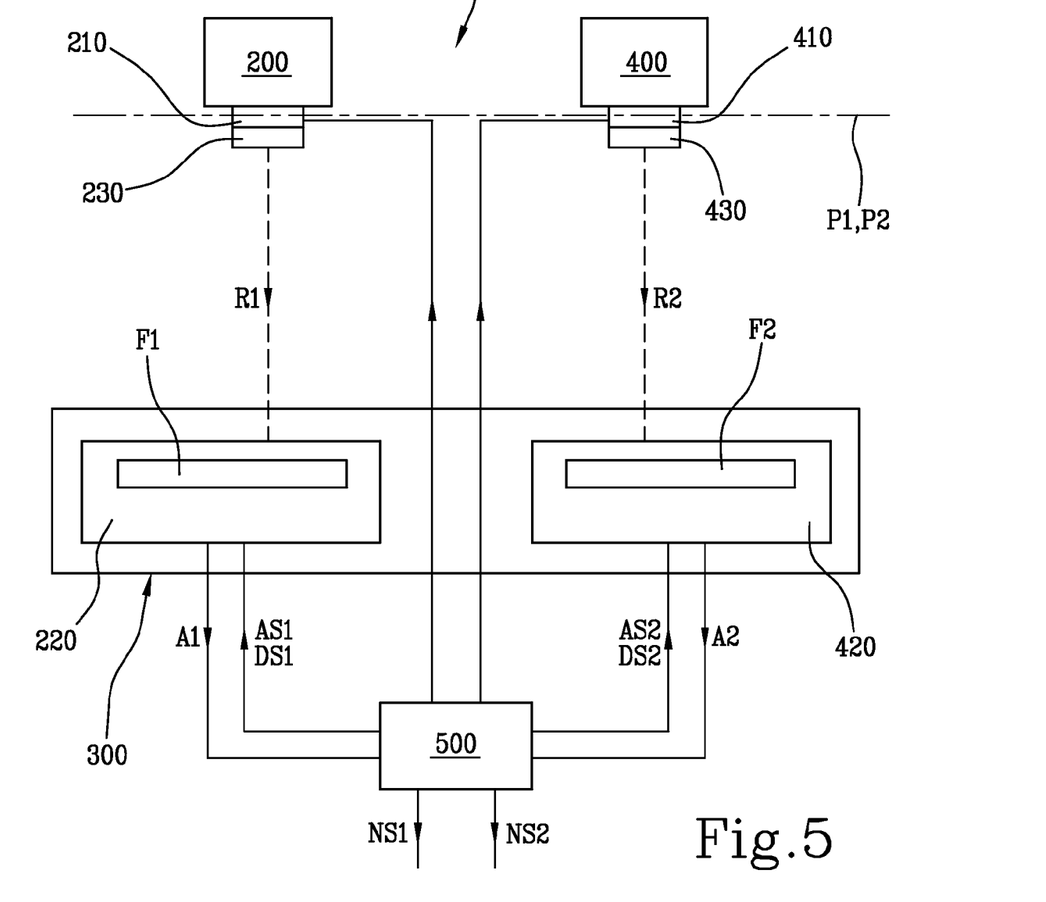
FIG. 5 shows a block diagram of the apparatus according to the invention.

The method according to the invention comprises providing, a first device 210 for emitting a first electromagnetic radiation R1 on a first tyre building member 200; (FIGS. 2a, 3 and 5).

Purely by way of example, the first building member 200 may be a member for depositing strip-like elements for producing a tyre for vehicle wheels, such as for example the aforementioned first deposition member 110.

Preferably the first emitter device 210 comprises a LED (Light Emitting Diode).

By way of example, the first emitter device 210 may be of the SFH 4231 OSRAM™ type.

Preferably, the first emission device 210 may have an emission power comprised between about 50 mW/sr and about 400 mW/sr.

Preferably said first electromagnetic radiation R1 has a wavelength substantially included between about 800 nm and about 1000 nm, and even more preferably included between about 900 nm and about 950 nm.

With the aim of providing the tyre 1, the first building member 200 is moved according to a preset trajectory.

During the movement of the first building member 200, there is detected at least one first image A1, in which the first electromagnetic radiation R1 defines a trajectory followed by the first emitter device 210.

Preferably the first building member 200 is configured for repeating a given movement a plurality of times, on occurrence of which the first emitter device 210 describes a corresponding given first trajectory T1. In particular the first image A1 fully contains the given first trajectory T1.

As even more clear hereinafter, the exposure time used for detection of the first image A1 is suitably controlled in order to obtain this result.

Preferably the first trajectory T1 described by the first emitter device 210 substantially lies in a first plane P1.

By way of example, returning to the schematic representation of the deposition of a strip-like element 50 in FIGS. 2a-2c, the plane P1 on which the first emitter device 210 moves, coincides with the plane of the sheet on which the figure is represented.

Lines of the first plane P1 are represented in FIGS. 3 and 5.

Preferably the first electromagnetic radiation R1 is transmitted along a direction substantially perpendicular to such first plane P1.

Still with reference to FIGS. 2a-2c, the first electromagnetic radiation R1 is propagated along a direction orthogonal to the sheet, in particular "exiting" from the very sheet, and passing through the point in which the first emitter device 210 is located.

Preferably the first image A1 is detected through a detecting structure 300, and in particular through a first detection device 220.

The first detection device 220 may comprise, for example, a camera, suitably activated and deactivated for the detection of the first image A1.

Preferably the first detection device 220 is positioned along an axis substantially orthogonal to the first plane P1, so as to prevent, during the movement of the first building member 200 and of the first emitter device 210, the variation of the distance between the focal plane of the first detection device 220 and the first emitter device 210, and thus the occurrence of loss of resolution.

Should this not be possible, for example due to the mechanical impossibility of positioning the first detection device 210 in this manner, it may be advantageous to use movements for tilting a lens associated with the first detection device 220. Preferably such movements are determined through Scheimpflug principle.

Otherwise, should the movement of the first emitter device 210 not occur on a single plane, there may be determined the position of the first detection device 220 so as to attain the best compromise between positioning and measuring precision.

Preferably the first detection device 220 has an acquisition window (not illustrated) substantially parallel to the aforementioned first plane P1, hence perpendicular to the direction of propagation of the first electromagnetic radiation R1.

Preferably the first detection device 220 is activated by a first activation signal AS1 generated automatically at the beginning of the movement of the first building member 200.

Preferably, the first detection device 220 is deactivated by a first deactivation signal DS1 generated automatically at the end of the movement of said first building member 200.

Such first activation signal AS1 and first deactivation signal DS1 may be generated by sensors, suitably provided for detecting representative parameters of the movement and/or the positioning of the first building member 200, or by a processing unit which shall be described hereinafter.

Advantageously the time interval included between the beginning and the end of the movement of the first building member 200 defines an exposure time for detection of the first image A1.

In other words, the first detection device 220 is maintained active, for detecting a single image, from the beginning to the end of the movement of the first building member 200. Thus doing, in the first image A1 there is represented the trajectory drawn by the first emitter device 210 within that time interval.

Preferably the exposure time used for the detection of the first image A1 is included between about 0.1 s and about 5 s, and in particular included between about 0.5 s and about 2 s.

Figure 4:
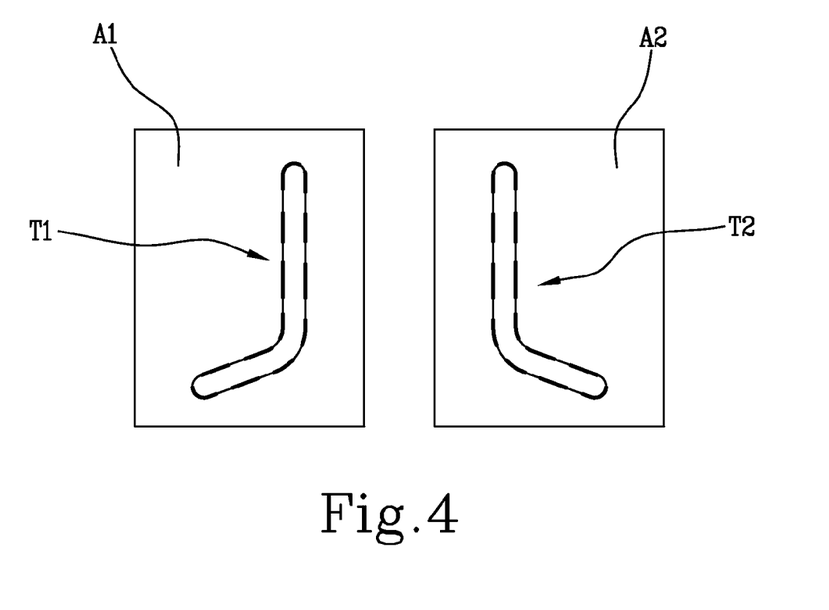
FIG. 4 schematically shows images detected during the performance of the method according to the invention.

Purely by way of example, FIG. 4 shows a first image A1 representative of the movement of the aforementioned first deposition member 110.

Preferably the first detection device 220 is repeatedly actuated for detecting a plurality of first images A1, each representative of a respective first trajectory T1 followed by the first building member 200.

Actually, the first building member 200, is controlled for continuously carrying out the same movements, so as to be able to intervene, for example, on a succession of strip-like elements 50, as described by way of example with reference to FIGS. 2*a*-2*c*.

Each first image A1 is thus representative of a movement that, during the process, is repeated continuously (or, at least, a given number of times) by the first building member 200.

The method according to the invention further comprises carrying out a first comparison between the first image A1 and one or more first reference data Ref1.

Such first reference data Ref1 may comprise, for example, prestored data defining an optimal theoretical trajectory for the first building member 200. In this manner, comparing the trajectory actually followed by the first building member 200 with the optimal theoretical one, allows verifying whether, and to what extent, the movement was performed correctly.

In addition or alternatively, should there be detected a plurality of first images A1, the first reference data Ref1 for a single image may comprise data representative of other first images, i.e. analogous detected images for previous movements and/or subsequent movements of the first building member 200. In practice, it may be verified whether the first building member 200 is capable of always carrying out, precisely, the same movement or whether, vice versa, it tends to move less correctly over time.

As a function of the aforementioned first comparison, i.e. the comparison between the first image A1 and the first reference data Ref1, there is generated a first notification signal NS1. The latter may be representative of the fact that the movement of the first building member 200 was executed correctly, or the fact that some problems occurred (for example poor precision of the followed trajectory).

In a preferred embodiment, the method according to the invention comprises varying an emission intensity of the first emitter device 210 along trajectory thereof over time.

In particular, such variation of intensity may be a periodic variation, in which the period is smaller than the time duration of the first trajectory T1.

For example, the variation in intensity may comprise alternation between a comparatively high emission intensity, and a comparatively low emission intensity.

In this manner, the trajectory drawn in the first image A1 shall be made up of portions with different intensity, each representative of a part of movement executed in a corresponding time interval.

FIG. 4 schematically shows the first trajectory T1, in the first image A1, formed by portions with greater intensity alternating with portions with lower intensity.

A solution of this type allows, still using a single detected image, providing a time connotation to the trajectory represented in such image, thus allowing performing more accurate control and analysis activities.

A practical example of the usefulness of this aspect shall be provided hereinafter, with reference to the comparison between the aforementioned first image A1 and a second image A2, representative of the movement of a second building member 400 which, according to the project parameters, should follow a symmetric trajectory and substantially simultaneous relative to that of the first building member 200.

In an embodiment, the variation in emission intensity of the first emitter device 200 is determined as a function of movements of other building members which cooperate to provide the tyre 1.

Preferably such other building members comprise a forming drum 30 having a cylindrical or toroidal configuration, and configured for rotating around a rotation axis thereof during the movement of the first building member 200. In particular the variation in intensity may be determined as a function of the angular position of such forming drum 30 relative to the aforementioned rotation axis.

Actually, returning to the example of the deposition of the strip-like elements 50, the forming support 30, besides rotating around the axis X-X (FIGS. 2*b*-2*c*), to allow the subsequent deposition of a plurality of strip-like elements, it is also rotated around the axis Y-Y, so as to allow each strip-like element to be deposited with a given inclination and following a given profile.

Figure 7:
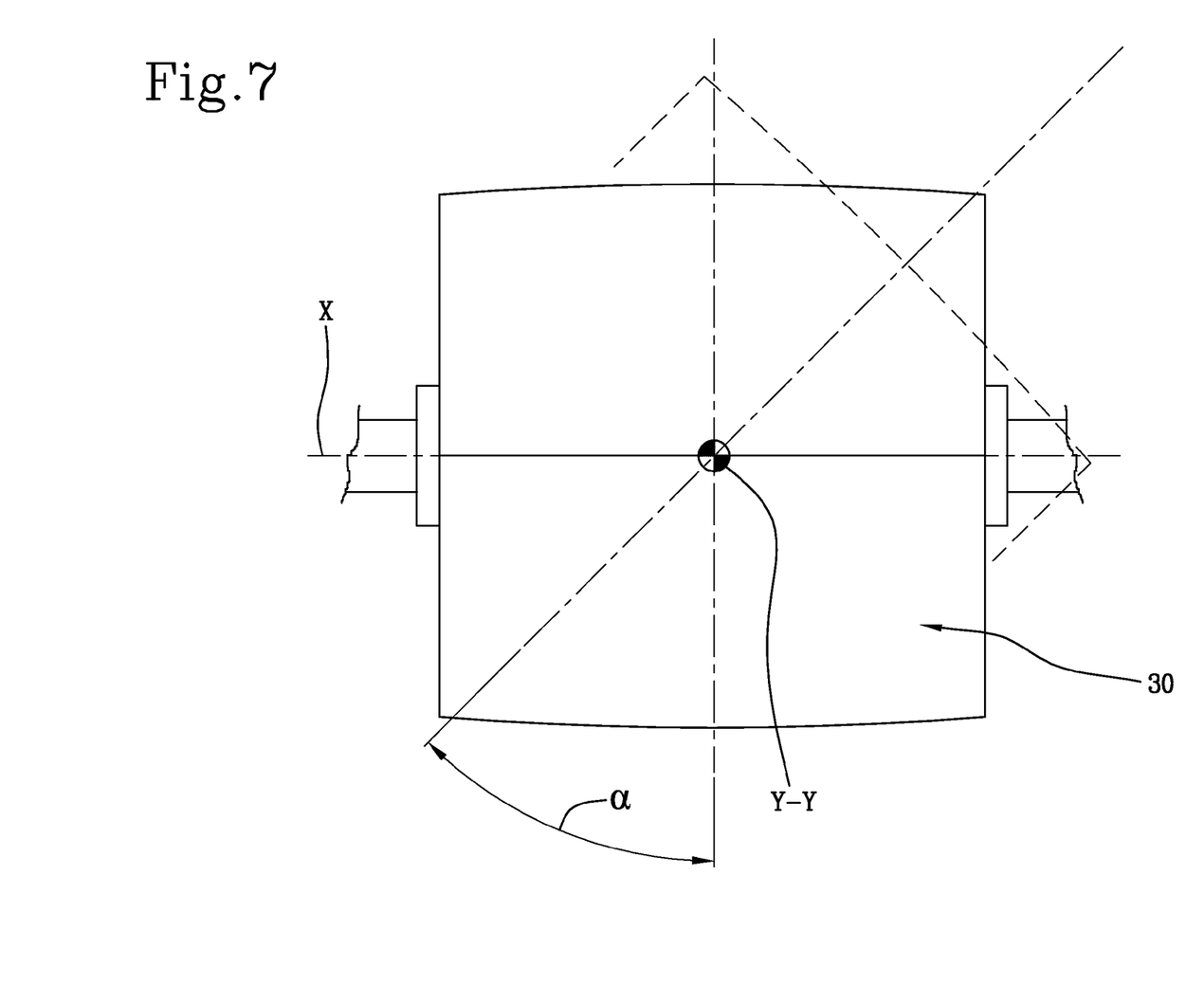
FIG. 7 schematically shows a movement of a forming support used in the process partly and schematically shown in FIGS. 2a-2c.

The rotation of the support 30 around the axis Y-Y is schematically represented in FIG. 7.

By way of example, imagining that the maximum angle of rotation of the support 30 around the axis Y-Y is equivalent to 45°, the first emitter device 200 may be guided as follows:

high intensity emission when the angle $\alpha$ is comprised between 0° and 15°;

low intensity emission when the angle $\alpha$ is comprised between 15° and 30°;

high intensity emission when the angle $\alpha$ is comprised between 30° and 45°.

In the first image A1 it will thus be possible to identify which trajectory portions were followed at the various angular intervals.

As mentioned, the first emitter device 210 may be a LED; for example, the supply power for a high intensity emission may be equivalent to about 500 mA, while the supply power for a low intensity emission may be equivalent to about 250 mA.

In a preferred embodiment, the method according to the invention comprises providing, on a second tyre building member 400, a second device 410 for emitting a second electromagnetic radiation R2 (FIGS. 3, 5).

Purely by way of example, the second building member 400 may be a member for depositing strip-like elements for producing a tyre for vehicle wheels, such as the aforementioned second deposition member 115.

Preferably, the second emitter device 410 and the second electromagnetic radiation R2 have, respectively, the same characteristics of the first emitter device 210 and the first electromagnetic radiation R1.

In particular, the second emitter device 410 comprises a LED (Light Emitting Diode).

By way of example, the second emitter device 410 may be of the SFH4231 OSRAM™ type.

Preferably, the second emission device 410 may have an emission power included between about 50 mW/sr and about 400 mW/sr.

Preferably the second electromagnetic radiation R2 has a wavelength substantially included between about 800 nm and about 1000 nm, and even more preferably included between about 900 nm and about 950 nm.

The first and the second building member 200, 400 cooperate to provide the tyre 1.

For this purpose the second building member 400 is suitably moved, preferably according to a preset synchronism relative to the first building member 200.

In the preferred embodiment, as mentioned, the first and second building member 200, 400 are constituted by respective deposition members 110, 115 of strip-like elements 50.

During the movement of the second building member 400, there is detected at least one second image A2, in which the second electromagnetic radiation R2 defines a trajectory followed by the second emitter device 410.

Preferably the second building member 400 is configured for repeating a given movement a plurality of times, on occurrence of which the second emitter device 410 describes a corresponding given second trajectory T2.

In particular the second image A2 fully contains the given second trajectory T2.

Analogously to what occurs regarding the first image A1, this result is obtained by suitably controlling the exposure time used for the detection of the second image A2. Further details thereof will be provided hereinafter.

Preferably the second trajectory T2 described by the second emitter device 410 substantially lies in a second plane P2.

By way of example, returning to the schematic representation of the deposition of a strip-like element 50 in FIGS. 2a-2c, the plane P2 on which the second emitter device 410 moves, coincides with the plane of the sheet on which the figure is represented.

Lines of the plane P2 are represented in FIGS. 3 and 5.

Preferably the second electromagnetic radiation R2 is transmitted along a direction substantially perpendicular to such second plane P2.

Still with reference to FIGS. 2a-2c, the second electromagnetic radiation R2 propagates along a direction orthogonal to the sheet, in particular "exiting" from the very sheet, and passing through the point in which the second emitter device 410 is located.

Preferably, the first plane P1 and the second plane P2 are substantially coincident (FIGS. 3, 5).

Preferably the second image A2 is detected through the detecting structure 300, and in particular through a second detection device 420.

The second detection device 420 may comprise, for example, a camera suitably activated and deactivated for detecting the second image A2.

Preferably the second detection device 420 has a positioning analogous to the first detection device 220.

In particular, the second detection device 420 is positioned along an axis substantially orthogonal to the second plane P2, so as to prevent, during the movement of the second building member 400 and the second emitter device 410, the variation of the distance between the focal plane of the second detection device 420 and the second emitter device 410, and thus the occurrence of a loss of resolution.

Should this not be possible, for example due to the mechanical impossibility of positioning the second detection device 420 in this manner, it may be advantageous to use movements for tilting a lens associated with the second detection device 420. Preferably such movements are determined through Scheimpflug principle.

Otherwise, should the movement of the second emitter device 410 not occur on a single plane, there may be determined the position of the second detection device 420 so as to attain the best compromise between positioning and measuring precision.

Preferably the second detection device 420 has an acquisition window (not illustrated) substantially parallel to the aforementioned second plane P2, hence perpendicular to the direction of propagation of the second electromagnetic radiation R2.

Preferably the second detection device 420 is activated by a second activation signal AS2 generated automatically at the beginning of the movement of the second building member 400.

Preferably, the second detection device 420 is deactivated by a second deactivation signal DS2 generated automatically at the end of the movement of said second building member 400.

Such second activation signal AS2 and second deactivation signal DS2 may be generated by sensors, suitably provided for detecting representative parameters of the movement and/or the positioning of the second building member 400, or by the processing unit described above.

Advantageously the time interval included between the beginning and the end of the movement of the second building member 400 defines an exposure time for the detection of the second image A2.

In other words, the second detection device 420 is maintained active, for detecting a single image, from the beginning to the end of the movement of the second building member 400. Thus doing, in the second image A2 there is represented the trajectory drawn by the second emitter device 410 within that time interval.

Preferably the exposure time used for the detection of the second image A2 is substantially equivalent to the exposure time used for the detection of the first image A1.

Preferably the exposure time used for the detection of the second image A2 is included between about 0.1 s and about 5 s, and in particular included between about 0.5 s and about 2 s.

Purely by way of example, FIG. 4 shows, beside a first image A1, also a second image A2, representative of the movement of the aforementioned second deposition member 115.

Preferably the second detection device 440 is repeatedly actuated for detecting a plurality of second images A2, each representative of a respective second trajectory T2 followed by the second building member 400.

Actually, the second building member 400, is controlled for continuously carrying out the same movements, so as to be able to intervene, for example, on a succession of strip-like elements 50, as described by way of example with reference to FIGS. 2a-2c.

Each second image A2 is thus representative of a movement that, during the process, is repeated continuously (or, at least, a given number of times) by the second building member 400.

Preferably, the aforementioned first notification signal NS1 is generated also as a function of the second image A2. In other words, the generation of the first notification signal NS1 may also consider the second image A2 detected.

In particular, the first reference data Ref1 for the first image A1 may comprise data representative of the second image A2.

This means that the first notification signal NS1 may be generated following a comparison between the first image A1 and the second image A2.

Preferably, the first image A1 and the second image A2 were detected in the same time interval.

Should there be detected a plurality of first images A1 and a plurality of second images A2, the comparison is preferably carried out between each first image A1 and the corresponding second image A2, i.e. the second image detected in the same time interval.

By way of example, in case of deposition of strip-like elements 50 through the aforementioned first and second deposition member 110, 115, the first and the second building member 200, 400 follow substantially symmetric trajectories relative to the relative axis Y-Y. Therefore, should the movements be carried out correctly, the two images should be, considering the axial symmetry, substantially superimposible.

The comparison between the first and the second image A1, A2 may consist in this superimposition operation: should the two trajectories not be symmetric, the first notification signal NS1 could be an alarm signal aimed at signalling this abnormal and potentially harmful situation.

Additionally or alternatively, the method according to the invention may comprise the performance of a second comparison between the second image A2 and one or more second reference data Ref2.

Such second reference data may comprise prestored data defining an optimal theoretical trajectory for the second building member 400.

Should there be detected a plurality of second images, the second reference parameters Ref2 for a single second image A2 may comprise data representative of previous detections and/or subsequent detections of other second images.

As a function of said second comparison, there is generated a second notification signal NS2.

In a preferred embodiment, the method according to the invention comprises varying over time an emission intensity of the second emitter device 410 along the trajectory thereof.

In particular, such variation of intensity may be a periodic variation, in which the period is smaller than the time duration of the second trajectory T2.

For example, the variation in intensity may comprise alternation between a comparatively high emission intensity, and a comparatively low emission intensity.

In this manner, the trajectory drawn in the second image A2 shall be made up of portions with different intensity, each representative of a movement part executed in a corresponding time interval.

FIG. 4 schematically shows the second trajectory T2, in the second image A2, formed by portions with greater intensity alternated with portions with smaller intensity.

Preferably the emission intensity of the first emitter device 210 and the emission intensity of the second emitter device 410 is varied so that, in each time instant, the first emitter device 210 and the second emitter device 410 substantially emit at the same intensity.

Should there be provided for that the first and the second building member 200, 400 follow substantially symmetric trajectories in a substantially simultaneous manner, this solution allows verifying in a simple and precise manner whether the project parameters are met: actually, comparing the first image A1 and the second image A2, it is possible to verify not only whether the trajectories followed are correct, but also whether the corresponding trajectory portions were covered in the same time interval.

In an embodiment, the variation in emission intensity of the second emitter device 410 is determined as a function of movements of other building members that cooperate to provide the tyre 1.

Preferably such other building members comprise a forming drum 30 having a cylindrical or toroidal configuration, and configured for rotating around a rotation axis thereof during the movement of the second building member 400. In particular the variation in intensity may be determined as a function of the angular position of such forming drum 30 relative to the aforementioned rotation axis.

Actually, as mentioned, the forming support 30 is rotated around the axis Y-Y. This rotation is schematically shown in FIG. 7.

By way of example, still considering a reference value equivalent to 45° for the angle α, the second emitter device 400 may be guided as follows:

high intensity emission when the angle α is comprised between 0° and 15°;
low intensity emission when the angle α is comprised between 15° and 30°;
high intensity emission when the angle α is comprised between 30° and 45°.

In the second image A2 it will thus be possible to identify which portions of trajectory were followed at the various angular intervals.

Analogously to the first emitter device 210, the power supply for the second emitter device 410 may be equivalent, for example, to about 500 mA for a high intensity emission, while the supply power for a low intensity emission may be equivalent to about 250 mA.

The method described above may be performed by an apparatus 600, to be described hereinafter.

The apparatus 600 comprises the first emitter device 210. Preferably the apparatus 600 comprises also the second emitter device 410.

Preferably the apparatus 600 also comprises a first optical structure 230 (FIGS. 5, 6) associated with the first emitter device 210 and having a first through hole 235 defining a passage port for the first electromagnetic radiation R1.

Figure 6:
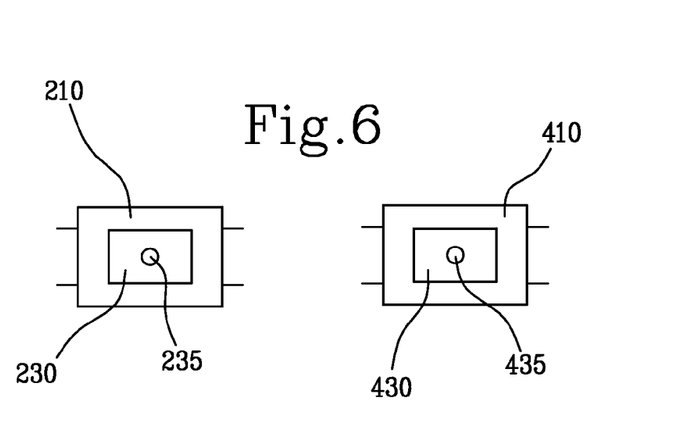
FIG. 6 shows a detail of elements part of the apparatus of FIG. 5.

Preferably the first through hole 235 is substantially circular shaped having a diameter substantially comprised between about 0.05 mm and about 2 mm.

Preferably the apparatus 600 also comprises a second optical structure 430 (FIGS. 5, 6) associated with the second emitter device 410 and having a second through hole 435 defining a passage port for the second electromagnetic radiation R2.

Preferably the first and the second through hole 235, 435 substantially identical shape and dimension.

In particular, the second through hole 435 is substantially circular-shaped substantially having a diameter substantially comprised between about 0.05 mm and about 2 mm.

The first and the second through hole 235, 435 may be referred to as "stenopeic holes".

Such holes have the task of obtaining a reasonable, and preferably optimal, compromise between the dimensions of the created luminous spot (which are closely related to the resolution of the detected images A1, A2) and the occurrence of the diffraction phenomena.

Actually, it would be ideally desirable to generate extremely small luminous spots, so as to be able to draw the movement of the building members 200, 400 in an extremely precise fashion. However, if the dimensions of holes 235, 435 drop below the critical dimensions, they may lead to diffraction phenomena, thus substantially making it impossible to accurately identify the position of the monitored member. Thus, a correct dimensioning of the stenopeic holes allows good detection accuracy, and avoids problems caused by diffractive phenomena.

The apparatus 600 also comprises the detecting structure 300.

As mentioned, the detecting structure 300 comprises preferably the first detection device 220, and in particular also the second detection device 420.

Preferably the apparatus 600 comprises a first bandpass filter F1 associated with the first detection device 220.

Preferably the apparatus 600 comprises a second bandpass filter F2 associated with the second detection device 420.

Preferably the first and/or the second bandpass filter F1, F2 is centred on the selected wavelength between about 700 nm and about 1200 nm and it has a bandpass substantially included between about 10 nm and about 100 nm.

It should be observed that suitably selecting the wavelength of the first and/or second electromagnetic radiation R1, R2, and the bandpass of the first and/or second bandpass filter F1, F2, allows obtaining advantages in terms of reducing the impact of sound due, for example, to the environmental lighting present where the apparatus 600 is required to operate. For example, dimensioning the system so as to use frequencies comprised in the "near-infrared" spectrum allows obtaining a substantial elimination of the interference due to the environmental lighting.

The apparatus 600 also comprises a processing unit 500 operatively associated with at least the detecting structure 300 and configured for carrying out the aforementioned first comparison between the first image A1 and the first reference data Ref1, and for generating the first notification signal NS1 as a function of such first comparison.

Preferably the processing unit 500 is configured for repeatedly actuating the first detection device 220 for detecting a plurality of first images A1, each representative of a respective trajectory of the first building member 200.

Preferably the processing unit 500 is configured for generating the aforementioned first activation signal AS1 and first deactivation signal DS1, for activating/deactivating the first detection device 220, so as to determine the exposure time for detection of each first image A1.

Preferably the processing unit 500 is connected to the first emitter device 210 for varying the emission intensity of the first emitter device 210 along the trajectory thereof over time.

Preferably the processing unit 500 is also connected to the second emitter device 410 for varying the emission intensity of the second emitter device 410 along the trajectory thereof over time.

The modes through which the emission intensities may be varied were described beforehand.

In particular the processing unit 500 is configured for varying the emission intensity of the first emitter device 210 and the emission intensity of the second emitter device 410 so that, at each time instant, the first emitter device 210 and the second emitter device 410 substantially emit at the same intensity.

Preferably the processing unit 500 is configured for generating the first notification signal NS1 also as a function of the second image A2.

Preferably the processing unit 500 is configured also for carrying out the aforementioned second comparison between the second image A2 and the second reference data Ref2, and for generating the second notification signal NS2 as a function of such second comparison.

Preferably the processing unit 500 is configured for repeatedly actuating also the second detection device 420 for detecting a plurality of second images A2, each representative of a respective trajectory of the second building member 400.

Preferably the processing unit 500 is configured for generating the aforementioned second activation signal AS2 and second deactivation signal DS2, for activating/deactivating the second detection device 420, so as to determine the exposure time for detection of each second image A2.

It should be observed that the processing unit 500 has been described as a single logic device capable of performing the operations described above. More precisely, the processing unit 500 may be obtained as a single physical device, or also as the combination of a plurality of electronic devices, suitably programmed and configured for carrying out the specified functions.

Advantageously the processing unit 500 is configured for, or it is connected to operating modules configured for, managing the building process. In this manner, for example, the processing unit 500 may be provided with the data required for establishing the degree of activation/deactivation of the first and/or the second detection device 220, 420.

As regards the first and the second notification signal NS1, NS2, they can be provided as alarm signals, for example of the acoustic and/or visual type, intended for the designated operators, in particular should there arise the need to rapidly signal situations that require immediate or short term interventions.

These notification signals NS1, NS2 mat be constituted by data transmission and parameters, representative of the detections and comparisons carried out, and intended for a processor configured to store such information, and/or serving the function of control, verification or further notification according to preset logics.

The invention claimed is:

1. A method for evaluating the movement of building members of tyre in a process for manufacturing, a tyre for vehicle wheels, comprising:
   providing a first emitter device emitting a first electromagnetic radiation on a first of the building members of the tyre;
   detecting, during movement of said first building member, a first image in which said first electromagnetic radiation defines a trajectory followed in said movement by said first emitter device;
   carrying out a first comparison between said first image and one or more first reference data; and generating a first notification signal as a function of said first comparison.

2. The method as claimed in claim 1, wherein said first building member is configured for repeating a given movement a plurality of times, on occurrence of which movement said first emitter device describes a corresponding given first trajectory.

3. The method as claimed in claim 2, wherein said First image fully contains said given first trajectory.

4. The method as claimed in claim 2, wherein the first trajectory described by said first emitter device substantially lies in a first plane.

5. The method as claimed in claim 4, wherein said first electromagnetic radiation is transmitted along a direction substantially perpendicular to said first plane.

6. The method as claimed in claim 1, wherein said first image is detected by a first detecting device.

7. The method as claimed in claim 6, wherein said first detecting device is activated by a first activation signal generated at a beginning of movement of said first building member.

8. The method as claimed in claim 7, wherein said first detecting device is deactivated through a first deactivation signal generated at an end of movement of said first building member.

9. The method as claimed in claim 8, wherein a time interval between said beginning and end of movement of said first building member defines en exposure time for detection of said first image.

10. The method as claimed in claim 6, comprising:
repeatedly actuating said first detecting device for detecting a plurality of first images, each representative of a respective trajector/ of said first building member.

11. The method as claimed in claim 10, wherein the first reference data tor each of said first images comprise one or more of other first images.

12. The method as claimed in claim 1, wherein said on or more first reference data comprise prestored data defining an optimal theoretical trajectory for said first building member.

13. The method as claimed in claim 1, comprising varying emission intensity of said first emitter device over time along said first trajectory.

14. The method as claimed in claim 13, wherein variation in intensity of said emission is a periodic variation in which a period is smaller than a time duration for said first emitter device to follow said first trajectory.

15. The method as claimed in claim 14, wherein said variation comprises alternation between a comparatively high emission intensity and a comparatively low emission intensity.

16. The method as claimed in claim 13, wherein variation is determined as a function of movements of other of the building members cooperating in manufacturing said tyre.

17. The method as claimed in claim 16, wherein said other building members comprise a forming drum configured for rotating around a rotation axis thereof during movement of said first building member, said variation being determined as a function of an angular position of said forming drum relative to said rotation axis.

18. The method as claimed in claim 1, comprising:
providing a second emitter device on a second tyre building member for emitting a second electromagnetic radiation: and
detecting, during movement of said second building member, a second image in which said second electromagnetic radiation defines a trajectory followed by said second emitter device, in said movement.

19. The method as claimed in claim 18, wherein said first notification signal is generated as a function of said first image and said second image.

20. The method as claimed in claim 19, wherein said one or more first reference data comprise data representative of said second image.

21. The method as claimed in claim 18, comprising:
carrying out a second comparison between said second image and one or more second reference data: and
generating a second notification signal as a function of said second comparison.

22. The method as claimed in claim 21, wherein said second reference data comprise prestored data defining an optimal theoretical trajectory for said second building member.

23. The method as claimed in claim 18, wherein said second building member is configured for repeating a given movement a plurality of times, on occurrence of which movement said second emitter device describes a corresponding given second trajectory.

24. The method as claimed in claim 23, wherein said second image fully contains said given second trajectory.

25. The method as claimed in claim 23, wherein the second trajectory described by said second emitter device substantially lies in a second plane.

26. The method as claimed in claim 25, wherein said second electromagnetic radiation is transmitted along a direction substantially perpendicular to said second plane.

27. The method as claimed in claim 26, wherein said first building member is configured for repeating a given movement a plurality of times, on occurrence of which movement said first emitter device describes a corresponding given first trajectory, wherein the first trajectory described by said first emitter device substantially lies in a first plane, wherein said first electromagnetic radiation is transmitted along a direction substantially perpendicular to said first plane, and wherein said first plane and second plane are substantially coincident.

28. The method as claimed in claim 18, wherein said second image is detected by means of a second detecting device.

29. The method as claimed in claim 6, further comprising associating a bandpass filter with said first detecting device, which filter is centered on a wavelength of said first electromagnetic radiation and has a bandpass substantially between about 10 nm and about 100 nm.

30. The method as claimed in claim 28, further comprising associating a bandpass filter with said second detecting device, which filter is centered on a wavelength of said second electromagnetic radiation and has a bandpass substantially between about 10 nm and about 100 nm.

31. An apparatus for evaluating movement of building members of a tyre in a process for manufacturing a tyre for vehicle wheels, comprising:
a first emitter device mounted on a first of the building members of the tyre and provided for emitting a first electromagnetic radiation;
a detecting structure for detecting, during movement of said first building member, a first image in which said first electromagnetic radiation defines a trajectory followed in said movement by said first emitting device; and
a processing unit operatively associated with at least said detecting structure and configured for:
carrying out a first comparison between said first image and one or more first reference data; and
generating a first notification signal as a function of said first comparison.

32. The apparatus as claimed in claim 31, wherein said first building member is a member for deposition of strip-like elements for producing a tyre for vehicle wheels.

33. The apparatus as claimed in claim 31, wherein said first building member is configured for repeating a given movement a plurality of times, on occurrence of which movement said first emitter device describes a corresponding given first trajectory.

34. The apparatus as claimed in claim 31, wherein said detecting structure comprises at least one first detecting device to detecting at least said first image.

35. The apparatus as claimed in claim 34, wherein said processing unit is configured for repeatedly actuating said first detecting device for detecting a plurality of first images, each representative of a respective trajectory of said first building member.

36. The apparatus as claimed in claim 35, wherein the first reference data for each of said first images comprise one or more of the other first images.

37. The apparatus as claimed in claim 31, wherein said one or more first reference data comprise prestored data defining an optimal theoretical trajectory for said first building member.

38. The apparatus as claimed in claim 31, wherein said processing unit is connected to said first emitter device for varying emission intensity of said first emitter device over time along said first trajebtoty.

39. The apparatus as claimed in claim 38, wherein variation is determined as a function of movements of other of the building members cooperating in producing said tyre.

40. The apparatus as claimed in claim 39, wherein said other building members comprise a forming drum configured for rotating around a rotation axis thereof during movement of said first building member, said variation being determined as a function of angular position of said forming drum relative to said rotation axis.

41. The apparatus as claimed in claim 34, wherein said processing unit is configured for generating a first activation signal and a first deactivation signal, for respectively activating and deactivating said first detecting device.

42. The apparatus as claimed in claim 31, comprising:
a second emitter device mounted on a second tyre building member and provided for emitting a second electromagnetic radiation,
wherein said detecting structure is adapted to detect, during movement of said second building member, a second image in which said second electromagnetic radiation defines a trajectory followed, in said movement, by said second emitter device.

43. The apparatus as claimed in claim 42, wherein said processing unit configured for generating said first notification signal also as a function of said second image.

44. The apparatus as claimed in claim 43, wherein said processina :unit is configured for:
carrying out a second comparison between said second image and one or more second reference data; and
generating a second notification signal as a function of said second Comparison.

45. The apparatus as claimed in claim 42, wherein said second building member is a member for deposition of strip-like elements for producing a tyre for vehicle wheels.

46. The apparatus as claimed in claim 31, further comprising a first optical structure associated with said first emitter device and having a first through hole defining a passage port for said first electromagnetic radiation.

47. The apparatus as claimed in claim 42, further comprising a second optical structure associated with said second emitter device and having a second through hole defining a passage port for said second electromagnetic radiation.

* * * * *